Aug. 15, 1944.    J. A. HAASE    2,355,647
BALER WIRE GUIDE
Filed Sept. 2, 1942    2 Sheets-Sheet 1
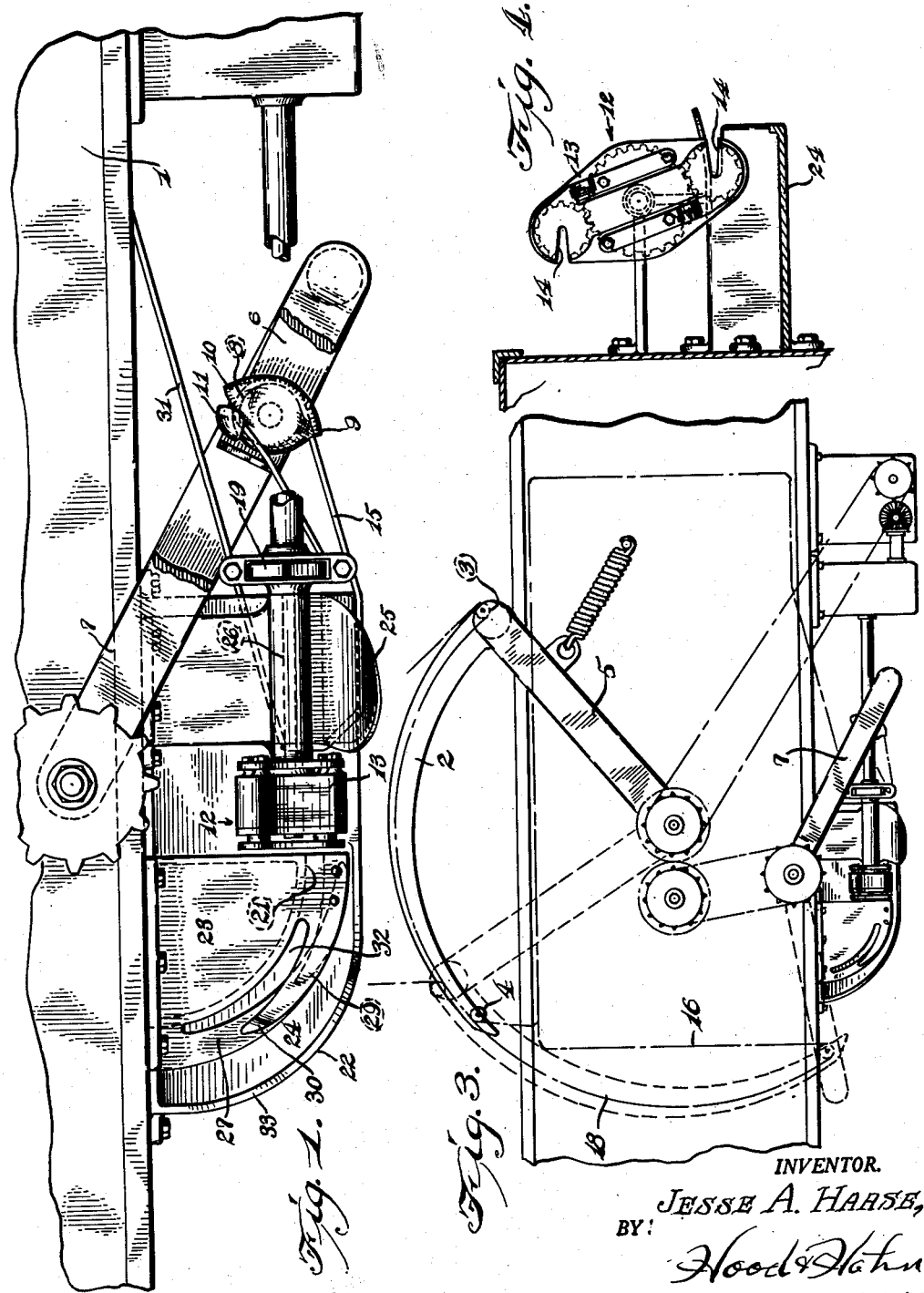
INVENTOR.
JESSE A. HAASE,
BY
Hood & Hahn.
ATTORNEYS Aug. 15, 1944.  J. A. HAASE  2,355,647
BALER WIRE GUIDE
Filed Sept. 2, 1942  2 Sheets-Sheet 2
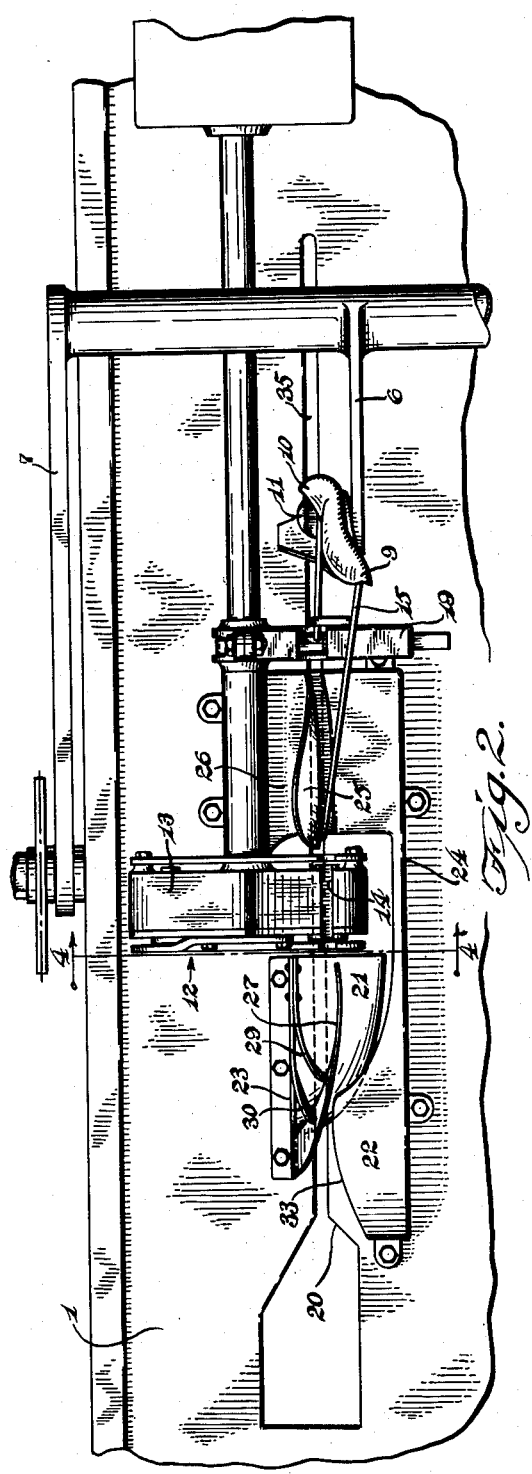
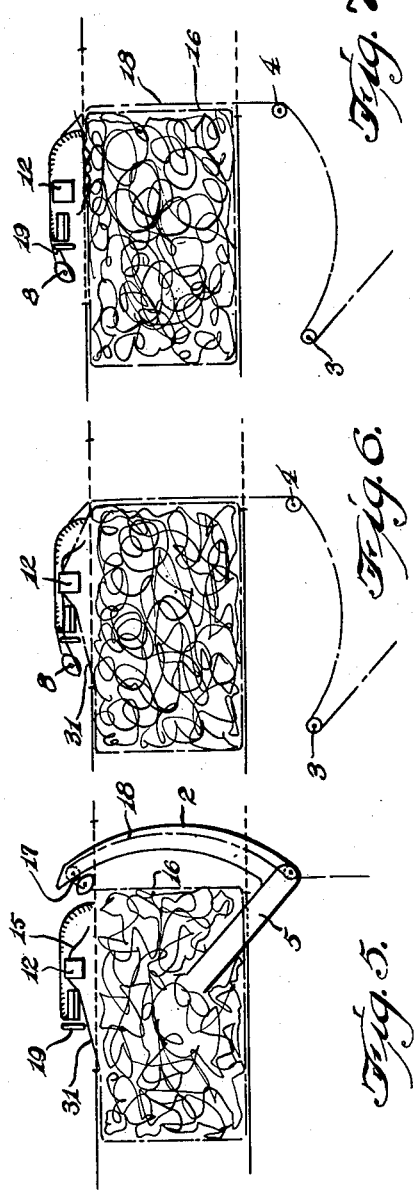
INVENTOR.
JESSE A. HAASE,
BY: Hood & Hahn.
ATTORNEYS.

Patented Aug. 15, 1944

2,355,647

UNITED STATES PATENT OFFICE 2,355,647

BALER WIRE GUIDE

Jesse A. Haase, Martinsville, Ind.

Application September 2, 1942, Serial No. 456,979

6 Claims. (Cl. 100—20)

The present invention relates to hay baling machines and more particularly to that type of hay baling machines in which there is provided means for automatically tying the binding wire or wires after the bale has been completed.

In my copending application, filed July 31, 1941, Serial No. 404,880, of which the present application is a continuation in part, there is disclosed a hay baling machine wherein there is provided means for automatically projecting the tying wire or wires across the baling chamber, which wire is gripped and held by a gripping mechanism during the forming of the bale whereby a bight is formed in the wire during the formation of the bale, said projecting means being then adapted to again project the wire across the bale to close the bight and provide a cross wire for the next succeeding bale. Associated with this gripping mechanism is a tying mechanism whereby the end of the held wire may be laid in the typing mechanism and through the operation of the gripping mechanism that portion of the wire closing the bight is also laid in the tying mechanism.

Specifically, it is one of the objects of the present invention to provide guiding means for the different wires which insures the placing of the proper wires in the tying mechanism through the operation of the gripper and which prevents the insertion in the tying mechanism of wires or loops of the wires which should not be placed in said tying mechanism.

For the purpose of disclosing my invention, I have illustrated an embodiment thereof in the accompanying drawings in which:

Fig. 1 is a plan view of my guiding means and so much of the gripping and tying means as is necessary for a disclosure of the present invention;

Fig. 2 is a side elevation of the mechanism illustrated in Fig. 1;

Fig. 3 is a plan view of so much of the baling mechanism including the wire feeding needle as is necessary for an understanding of my invention;

Fig. 4 is a sectional view on the line 4, 4 of Fig. 2; and

Figs. 5, 6 and 7 are diagrammatic views showing different steps in the feeding and tying of the tie wire or wires.

In the embodiment illustrated, there is provided a baling chamber 1 in which is adapted to reciprocate a baling plunger which, as the material to be baled is fed into the baling chamber in advance of the plunger, forces the material forwardly in the baling chamber. The baling chamber is somewhat tapered to offer a certain resistance to the movement of the material so that, as the material is forced forward, a compact bale of material is formed. At a point intermediate the ends of the baling chamber, in advance of the plunger in its retracted position and behind the rear end of a completed bale, I provide an oscillating needle which comprises an arcuate finger 2 having at one end a wire guide roller 3 and a second wire guide roller 4 at its free end. This needle is carried on an oscillating arm 5 pivotally mounted above the baling chamber (see Fig. 3) which is adapted to oscillate the needle in a direction to project the needle across the baling chamber and to retract the same back to its normal position.

On the opposite side of the baling chamber, I provide a swinging gripper arm 6 mounted on an oscillating frame 7 and adapted to swing in an arc longitudinally of the side of the baling chamber. This gripper arm carries a wire gripper comprising a disc 8 above which is mounted a wire guide having a downwardly inclined guide finger 9 and an upwardly inclined guide finger 10. Associated with the disc and the guide finger 10 is a crimper arm 11, the arrangement being such that during the movement of the swinging arm 6, the wire to be gripped will feed under the guide finger 9, be wrapped around the disc 8 and guided between the crimper 11 and the disc to crimp a loop of wire in a position to be held by the gripper.

This gripper is adapted to be swung back and forth at suitable timed intervals, after a bale has been completed, to lay a strand of the binding wire in a wire tie mechansm 12, pick up a second strand of the wire, and lay the same in the throat of the wire tie mechanism. The wire tie mechanism, as indicated at Fig. 4, is mounted at one side of the baling chamber and comprises a rotating frame 13 comprising two side members, each of which at its opposite ends has oppositely facing wire-receiving throats 14. Disposed between these side members are rotating twister members having radial slots or throats coincident with the throats 14 and adapted, after a pair of wires have been laid in these throats, to twist the wires into a tie. The entire tie mechanism is also adapted to rotate to carry the twisted strands of wires inwardly adjacent the side of the baling chamber which is slotted at this point to permit the wire to lie adjacent the bale proper. During this rotation, the wire tie mechanism discharges the tie and moves to a position to receive another tie.

In the operation of the mechanism, the wire from the source of supply is carried over the roller 3 of the needle, thence over the roller 4 of the needle across the baling chamber 1 and locked in the gripper. This provides a strand of wire extending across the baling chamber ahead of the baling plunger. As the material to be baled is fed forward against this strand by the repeated operations of the baling plunger, the strand of wire is forced forward, one end remaining locked against movement and the wire being fed from the wire supply, so that a bight is formed in the wire, one side of the bight extending parallel on the near side of the chamber and the other side of the bight extending parallel of the bale on the far side of the chamber, with that strand of the wire on the far side looped around a post and extending forwardly to the gripper. After the bale has been completed, the needle arm 2 is projected across the bale forming a loop of two strands, one strand comprising the closing strand for the bight and the other strand forming the cross wire for the next succeeding bale. At this time, the swinging arm 6 will be swung rearwardly with the gripper carrying the loop strand 15 of the wire rearwardly and laying this loop strand in a throat 14 of the tie. The gripper then continues rearwardly and passing beneath the cross strand 16 engages this cross strand at approximately the point 17 (see Fig. 5) of the loop and as the gripper again moves forwardly, this cross strand 16 will also be laid in the tie so that the two strands can be tied together. After the tie has been completed, the cross strand is severed beyond the tie by the cutter 19, leaving the second strand 18 of the loop across the baling chamber for the next succeeding bale.

During the oscillating movements of the gripper and during the operation of the tie mechanism, it is necessary to see to it that the cross wire 16 is laid in the tie mechanism properly and, at the same time, the second cross wire 18 is prevented from being laid in the tie mechanism so that there will be no danger of the various wires being tied together, preventing the proper operation of the mechanism. To this end, at the point where the needle is adapted to project through the side of the baling chamber, I provide an enlarged opening through which the needle may project, which opening, on its lower side, is provided with a cam shoulder 20. Also mounted on the far side of the baling chamber are guides, one an upper guide 21 and the other a lower guide 22. These guides are mounted on suitable plates bolted to the side walls of the baling chamber, one of the plates 23 being disposed above the opening in the side wall of the baling chamber for the wire and the other plate 24 being disposed below this opening. In addition to the guides 21 and 22, I also provide a projecting fin 25 formed on a loop post 26 which is part of the casting carrying the guide 22. The guides 21 and 22 are to the rear of the tie mechanism 12 while the fin 25 and post 26 are forwardly of the tie mechanism so that the tie mechanism proper operates between these two structures.

Also secured to the plate 23, on the under face thereof, is a downwardly and forwardly inclined spring finger 27 which lies at an angle to the side wall of the baling chamber and is adapted to cooperate with a pair of spring fingers 29 and 30, likewise secured to the under face of the plate 23.

In the operation of the apparatus, with the bight formed about the bale and one side 31 of the bight extending rearwardly under the fin 25 and then forwardly at 15 and over the gripper, upon the completion of the bale, the needle 2 will project through the baling chamber and beyond the far side of the bale chamber substantially in the dotted line position shown in Fig. 3. In this position, a loop is projected across the baling chamber having one strand 16 closing the bight of the wire and a second strand 18 extending to the source of supply. As soon as this is done, the arm 6 swings on its arc rearwardly carrying rearwardly with it the gripper and swinging the strand 15 of the wire rearwardly to form, in effect, a continuation in a substantially straight line of the strand 31. In so doing, the strand 15 will enter one of the throats 14 of the tie mechanism 12, and will then pass between the lower finger 27 and the upper fingers 29 and 30 and lie in the slot 22. With the straightening out of the wire 15, the kink of the wire in the gripper will be straightened and there will be a tendency for the wire to slip out of the gripper leaving the gripper clear. As the gripper continues to move rearwardly and into parallelism with the side wall of the chamber, this strand 15 will slip out of the gripper and the gripper will move into a position in the loop formed between the strands 16 and 18 of the wire with the strand 16 lying on top of the guide and the strand 18 guided beneath the guide 9 so that as the gripper swings forwardly again carrying the wire loop formed by the strands 16 and 18, the strand 16 will be somewhat above the plane of the strand 18 and will be guided by the cam surface 20 into the slot 35. Moving through that slot, the strand 16 will engage the lower surface of the finger 27 and will be guided by that finger into the throat 14 of the tie mechanism. The lower strand 18, however, being held back by the needle from engagement with the cam 20, will pass around the outside of the guide member 22 and will thus be prevented from moving into the throat. In other words, the wire strands will assume the positions illustrated in Fig. 6 by the time the gripper has been swung to its forward position again. The wire tie mechanism is now rotated to form the tie and to swing the tied wires inwardly toward the baling chamber and after the tie has been completed, the cutter 19 will operate to sever the wire strand 16 leaving the bale free to be projected from the chamber and leaving a strand of wire 18 extending from the source of supply across the bale chamber and then forwardly into the gripper. As the new bale is pushed forward forming a bight in the tie wire, the portion of this wire within the baling chamber will be pulled forward from within and will engage and slide up the cam shoulder 20 in the baling chamber wall, and thus into the slot 35 in said wall. As this wire is pulled still farther along during the formation of the new bale, it will engage the cam surface 21 and will thereby be guided downwardly to pass beneath the tie mechanism and to engage the post 26 in the plane of the slot 35. Thus a new bight is formed with the parts of the wire in substantially the positions indicated in Figs. 1 and 2.

I claim as my invention:

1. In a baling machine, in combination, a baling chamber and a reciprocating plunger operating therein, a wire gripper disposed on one side of said chamber for gripping the free end of a wire extending across said chamber, said gripper being movable longitudinally back and forth of said chamber and being adapted to hold said free end while said gripper is in its forward position, a wire tie mechanism on the same side of said chamber as said gripper, a feeding needle reciprocable across the baling chamber from the side thereof opposite said gripper for projecting a wire loop across said chamber with one strand adjacent the rear end of a formed bale and the other extending from a source of supply, said gripper being movable rearwardly of the baling chamber for laying the free end of the wire in said tie mechanism and at the completion of its rearward movement being adapted to grip said needle loop and said gripper being movable forwardly for laying the strand of said loop which is adjacent said bale in said tie mechanism, and means for preventing the other strand of said needle loop from entering said tie mechanism as the bale strand of the loop is laid in said tie mechanism by the forward movement of said gripper.

2. In a baling machine, in combination, a baling chamber and a reciprocating baling plunger operating therein, a wire gripper disposed on one side of said chamber for gripping the free end of a wire extending across said chamber, said gripper being movable longitudinally back and forth of said chamber, a wire tie mechanism disposed on the side of said chamber adjacent said gripper, a feeding needle reciprocable across the baling chamber from the side thereof opposite said gripper for projecting a wire loop across said chamber with one strand adjacent the rear end of the formed bale and the other extending from a source of supply, said gripper being movable rearwardly of the baling chamber for laying the free end of the wire in said tie mechanism and at the completion of its rearward movement being adapted to grip said needle loop, and said gripper being movable forwardly for laying a strand of said loop which is adjacent said bale in said tie mechanism, means for preventing the entry of the other strand of the needle loop in said tie mechanism during the forward movement of said gripper, and means for guiding said second needle loop strand to clear said tie mechanism as said last-named strand is moved forwardly during the formation of a bale.

3. In a baling machine, in combination, a baling chamber and a reciprocating plunger operating therein, a wire gripper disposed on one side of said chamber for gripping the free end of a wire extending across said chamber, said gripper being movable longitudinally back and forth of said chamber and being adapted to hold said free end while said gripper is in its forward position, a wire tie mechanism disposed rearwardly of the forward position of said gripper, a feeding needle reciprocable across the baling chamber from the side thereof opposite said gripper and adapted to project a wire loop across said chamber with one strand of said loop adjacent the rear end of a formed bale and the other extending from a source of supply, said gripper being movable rearwardly of the baling chamber for laying said free end in said tie mechanism, means for restraining said free end against displacement, said gripper at the completion of its rearward movement being adapted to grip said needle loop and said gripper being movable forwardly for laying the strand of said needle loop adjacent the bale in said tie mechanism, and means for preventing the other strand of said needle loop from entering said tie mechanism during the forward movement of said gripper.

4. In a baling machine, in combination, a baling chamber, a reciprocating plunger operating therein, a wire gripper disposed on one side of said chamber for gripping the free end of a wire, a holding post adjacent said gripper, said wire being adapted to extend rearwardly from said gripper around said holding post and across the baling chamber, a wire tie mechanism disposed rearwardly of said post, said gripper being movable longitudinally back and forth of said chamber, a feeding needle reciprocable across the baling chamber from the side thereof opposite said gripper and adapted to project a wire loop across said chamber with one strand of said loop adjacent the rear end of a formed bale and the other extending from a source of supply, said gripper in its rearward movement being adapted to carry the said free end of the wire rearwardly and to lay the same in said wire tie mechanism and at the completion of said rearward movement to grip said needle loop, and said gripper on its forward movement being adapted to lay the strand of said loop adjacent the bale in said tie mechanism and to carry the other strand of said loop forwardly, means for preventing said other strand from entering said tie mechanism, and means for deflecting said other strand from said tie during the forward movement of said other strand under the progressive movement of a bale.

5. In a baling machine, in combination, a baling chamber and a reciprocating plunger operating therein, a wire tie mechanism disposed on one side of said chamber, a wire gripper disposed on the same side of said chamber and adapted to move longitudinally back and forth of said chamber, a loop post disposed between said tie mechanism and the forward position of said gripper whereby when said gripper is in its forward position and gripping the free end of the tie wire a loop will be formed in the tie wire with one strand extending substantially parallel and rearwardly of the baling chamber, said loop passing around said post, and the other strand extending forwardly to said gripper, said gripper in its rearward movement being adapted to carry said forwardly extending strand rearwardly and to lay the same in said tie mechanism with an end projecting rearwardly beyond said tie mechanism, resilient members disposed to the rear of said tie mechanism and adapted to permit the passage therebetween of said rearwardly projecting wire end and to maintain said end against displacement, a reciprocating needle adapted to project across said baling chamber to the rear of said tie mechanism and to carry across said chamber a wire loop one strand of which lies adjacent to the completed bale and the other strand of which extends to the source of supply, said gripper after laying the free end of the wire in said tie mechanism being adapted to grip the needle loop and carry the two strands thereof forwardly while maintaining the same in planes one above the other, a stationary guide member for guiding the bale strand of said needle loop into a plane coincident with the receiving portion of said tie mechanism and blocking the movement of the other portion of said needle loop toward the side of the baling chamber whereby, as the gripper moves toward its forward position, the bale strand of said needle loop will be moved into the tie mechanism and the other strand will be prevented from moving into the tie mechanism, and a second stationary guide for deflecting said second needle loop strand downwardly beneath the tie mechanism during the forward movement of said last-named strand under the influence of a forming bale.

6. In a baling machine, a baling chamber formed with a longitudinally-extending slot in one side wall thereof, said slot being formed at its rear end with a vertical enlargement merging with the body of said slot in an upwardly inclined cam surface, a tie mechanism carried adjacent said slotted wall forwardly of said enlargement and formed to provide a wire-receiving twister mouth disposed substantially in the plane of the body of said slot, a baling plunger reciprocable in said chamber and occupying a position, when fully retracted, spaced rearwardly from said slot enlargement, a stationary post adjacent said tie mechanism and forwardly thereof, a needle having an end normally occupying a position on the side of said chamber opposite the tie mechanism but projectible through said chamber and through said enlargement to carry a loop of wire across said chamber, a gripper mounted on the same side of said chamber with said tie mechanism and movable between a position spaced forward from said tie mechanism and a position in which said gripper will engage the wire loop projected across said chamber by said needle, means for guiding the strand of said loop adjacent the bale into the mouth of said tie mechanism as said gripper moves from its loop-engaging position to its forward position, and means for withholding the other strand of said loop from said mouth during such movement of said gripper, and for guiding said last-named strand, during subsequent formation of a new bale, to move past said tie mechanism without entering said tie mechanism mouth.

JESSE A. HAASE.